(12) United States Patent
Griffith et al.

(10) Patent No.: US 7,828,237 B2
(45) Date of Patent: Nov. 9, 2010

(54) MODULAR GRINDING CORE AND GRINDING DEVICES INCORPORATING THE SAME

(75) Inventors: Jonah S. Griffith, Seattle, WA (US);
Adam A. Jossem, Seattle, WA (US);
John R. Prins, Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 169 days.

(21) Appl. No.: 12/267,042

(22) Filed: Nov. 7, 2008

(65) Prior Publication Data

US 2009/0200410 A1    Aug. 13, 2009

Related U.S. Application Data

(60) Provisional application No. 61/002,718, filed on Nov. 9, 2007.

(51) Int. Cl.
*A47J 42/32*    (2006.01)
(52) U.S. Cl. .................................. 241/169; 241/291
(58) Field of Classification Search ................ 241/168, 241/169, 169.1, 169.2, 291
See application file for complete search history.

(56) References Cited

U.S. PATENT DOCUMENTS

| | | | |
|---|---|---|---|
| 95,135 A | 9/1869 | Petrie |
| 265,819 A | 10/1882 | Johnston |
| 1,020,380 A | 3/1912 | Williams |
| 1,264,134 A | 4/1918 | Quick |
| 1,481,632 A | 1/1924 | Tatum |
| 1,588,552 A | 6/1926 | Sprinkle |
| 1,692,162 A | 11/1928 | Exsternbrink |
| 1,947,253 A | 2/1934 | Ellis |
| 3,120,354 A | 2/1964 | Kachelmann |
| 3,237,873 A | 3/1966 | Raski |
| 3,827,641 A | 8/1974 | Andersson |
| 4,226,370 A | 10/1980 | Watson |
| 4,374,574 A | 2/1983 | David |
| 4,573,244 A | 3/1986 | Holcomb et al. |
| 4,610,397 A | 9/1986 | Fischer et al. |
| 4,632,322 A | 12/1986 | Beilstein |
| 4,685,627 A | 8/1987 | Lee |

(Continued)

FOREIGN PATENT DOCUMENTS

BE    407369    2/1935

(Continued)

*Primary Examiner*—Mark Rosenbaum
(74) *Attorney, Agent, or Firm*—Seed IP Law Group PLLC

(57) ABSTRACT

A modular grinding core includes a housing configured to be operatively installed in a variety of external grinding devices, a rasp support member having a coupling adapter configured to be operatively coupled to an actuation mechanism of a first external grinding device at a first time and to an actuation mechanism of a second external grinding device at a second time after being removed from the first external grinding device. The rasp support member includes a receptacle configured to removably receive any one of a variety of rasps. The rasp support member is configured to reciprocate in response a force exerted by the external grinding device. The modular grinding core further includes a grind block member resisting displacement of the food items or spices away from the rasp support member, and an adjustment mechanism allowing a user to adjust a gap between the grind block and rasp support members.

22 Claims, 12 Drawing Sheets

U.S. PATENT DOCUMENTS

| | | | |
|---|---|---|---|
| 4,697,749 | A | 10/1987 | Holcomb et al. |
| 4,709,865 | A | 12/1987 | Bounds |
| 4,830,291 | A | 5/1989 | Williams |
| 4,844,352 | A | 7/1989 | Griffin |
| 5,078,327 | A | 1/1992 | Kemetter |
| 5,082,190 | A | 1/1992 | Chen |
| 5,148,995 | A | 9/1992 | Hurst |
| 5,269,475 | A | 12/1993 | Diefenbach |
| 5,531,389 | A | 7/1996 | Husted |
| 5,651,506 | A | 7/1997 | Hockey |
| 5,660,341 | A | 8/1997 | Perkins et al. |
| 5,685,501 | A | 11/1997 | Wagner |
| 5,730,374 | A | 3/1998 | Wu |
| 5,988,543 | A | 11/1999 | Wu |
| 6,511,006 | B1 | 1/2003 | Holcomb et al. |
| 6,616,076 | B2 | 9/2003 | Wong |
| 6,672,524 | B1 | 1/2004 | Holcomb et al. |
| 6,871,808 | B2 | 3/2005 | Holcomb et al. |
| 6,926,214 | B2 | 8/2005 | Holcomb et al. |
| 7,210,643 | B2 | 5/2007 | Holcomb et al. |
| 7,591,439 | B2 * | 9/2009 | Tang ........................ 241/169.1 |
| 7,708,220 | B1 * | 5/2010 | Tang ........................ 241/169.1 |
| 2004/0164192 | A1 * | 8/2004 | Chang ........................ 241/100 |
| 2010/0147982 | A1 * | 6/2010 | Tang ........................ 241/36 |

FOREIGN PATENT DOCUMENTS

| | | |
|---|---|---|
| DE | 643997 | 4/1937 |
| EP | 0282259 A2 | 3/1988 |
| FR | 777375 | 2/1935 |
| FR | 821940 | 12/1937 |
| GB | 2355946 A | 5/2001 |
| WO | 0028870 A2 | 5/2000 |
| WO | 0219880 A2 | 3/2002 |
| WO | 2008109074 A1 | 9/2008 |

* cited by examiner

US 7,828,237 B2

MODULAR GRINDING CORE AND GRINDING DEVICES INCORPORATING THE SAME

CROSS-REFERENCE TO RELATED APPLICATION

This application claims the benefit under 35 U.S.C. §119(e) of U.S. Provisional Patent Application No. 61/002,718 filed Nov. 9, 2007, where this provisional application is incorporated herein by reference in its entirety.

BACKGROUND

1. Technical Field

The present disclosure is generally related to kitchenware, and more particularly, to a modular device for grinding food items, such as spices.

2. Description of the Related Art

Devices used to grind food items, such as pepper grinders often come in various shapes and sizes depending on the application and industrial design parameters. Typically, use and design parameters of an exterior of such devices govern the design of the interior thereof, including the working portion of the grinder. Accordingly, these devices incorporate a distinct working portion for distinct grinders. Such customization tends to add to the cost of design, manufacturing and materials for producing the finished grinder product. Additionally, users are burdened with being required to adapt to various grinders having various types of working portions, which operate differently. Furthermore, when the useful life of the working portions expires, typically the entire grinding product requires replacement.

BRIEF SUMMARY

According to one embodiment, a modular grinding core, for use with a variety of external grinding devices having an actuation mechanism, and for use with a variety of rasps each having a distinct plurality of grinding protuberances, to grind a spice or food item, may be summarized as including a housing having a base, a cap portion, and a body at least partially extending between the base and the cap portion; a rasp support member having a coupling adapter configured to be operatively coupled to the actuation mechanism of a first external grinding device at a first time and to the actuation mechanism of a second external grinding device at a second time after being removed from the first external grinding device, the rasp support member being moveably coupled to the housing and configured to reciprocate along a first axis in response to a force exerted by the actuation mechanism; and a grind block member moveably coupled to the housing and positioned adjacent the rasp support member forming an adjustable gap between the grind block member and the rasp support member, the grind block member being configured to resist displacement of the spice or food item away from the rasp support member.

According to one embodiment, a modular grinding kit may be summarized as including at least a first external grinding device having a housing and an actuation mechanism; at least a first rasp member having a first plurality of grinding protuberances, to grind a spice or food item; a modular core at least partially positionable within the housing of the first external grinding device including: a housing having a base, a cap portion, and a body at least partially extending between the base and the cap portion; a rasp support member having a coupling adapter configured to be operatively coupled to the actuation mechanism of the first external grinding device and removably coupled to the first rasp member, the rasp support member being moveably coupled to the housing and configured to reciprocate along a first axis in response to a force exerted by the actuation mechanism; and a grind block member moveably coupled to the housing and positioned adjacent the rasp support member forming an adjustable gap between the grind block member and the rasp support member, the grind block member being configured to resist displacement of the spice or food item away from the rasp support member.

DETAILED DESCRIPTION

Figure 1:
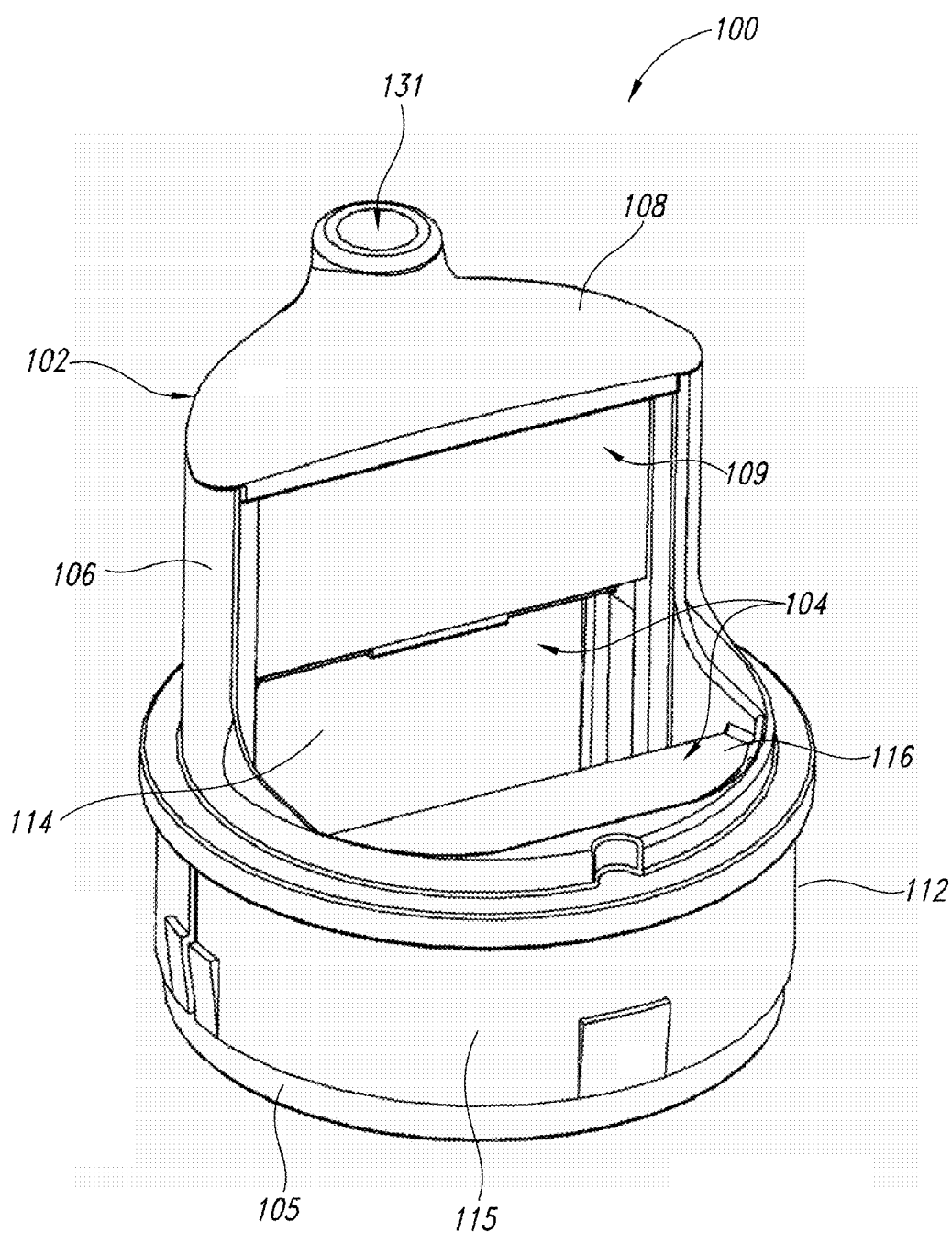
FIG. 1 is an isometric view of a modular grinding core according to one embodiment.

FIG. 1 illustrates a modular core 100 according to one embodiment, the modular core 100 being configured to be operatively coupled to an external grinding device. The modular core 100 includes a housing 102 and a working portion 104. The housing 102 can at least partially enclose the working portion 104. The housing 102 includes a base 105, a body 106, and a cap portion 108. At least a portion of the body 106 extends between the cap portion 108 and the base 105. The modular core 100 may further include an adjusting mechanism 112 configured to adjust a degree of grinding when the modular core 100 is in operation. The working portion 104 includes a rasp support member 114 and a grind block member 116.

Figure 2:
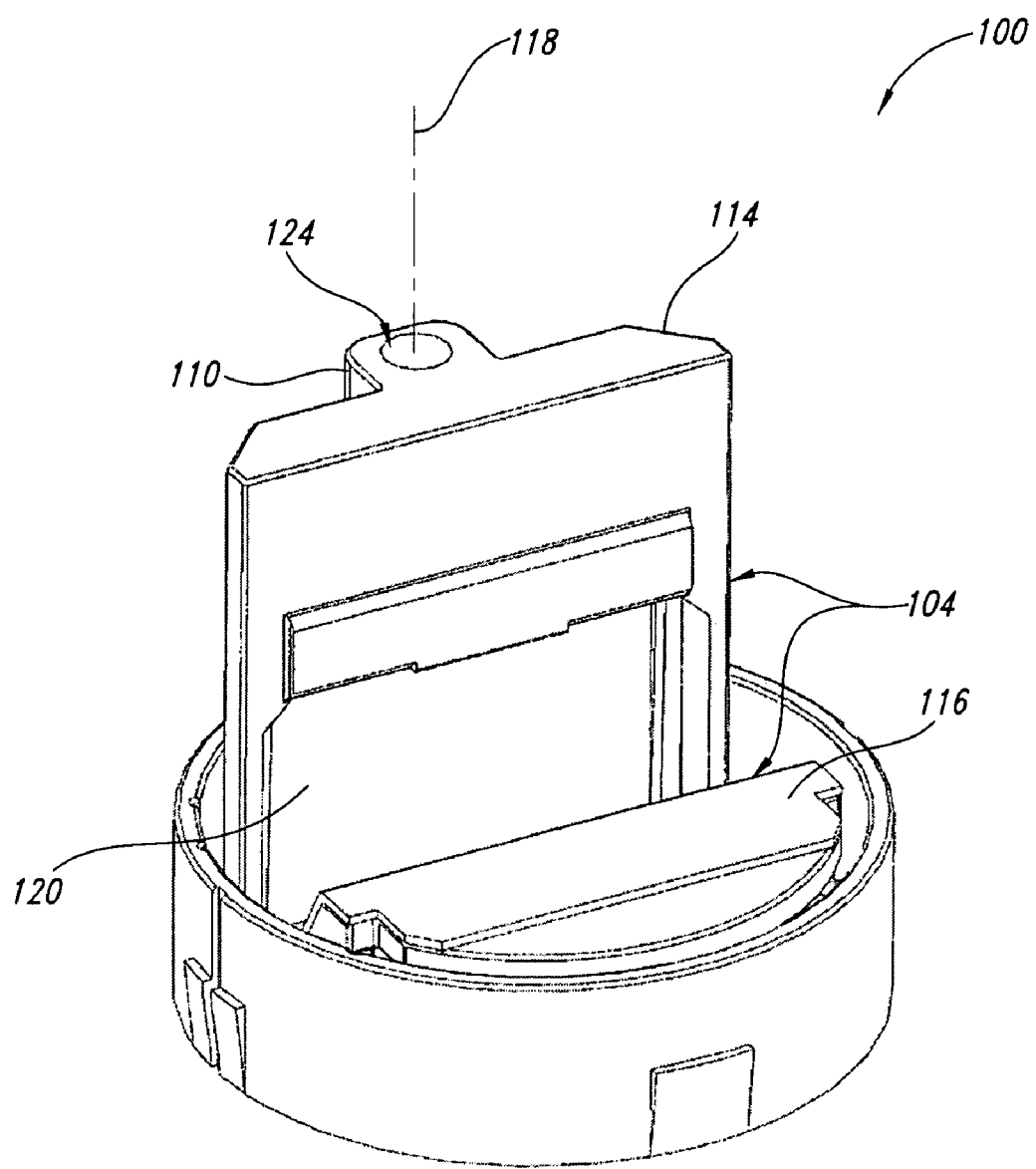
FIG. 2 is an isometric view of a working portion of the modular grinding core of FIG. 1 according to one embodiment.
Figure 3:
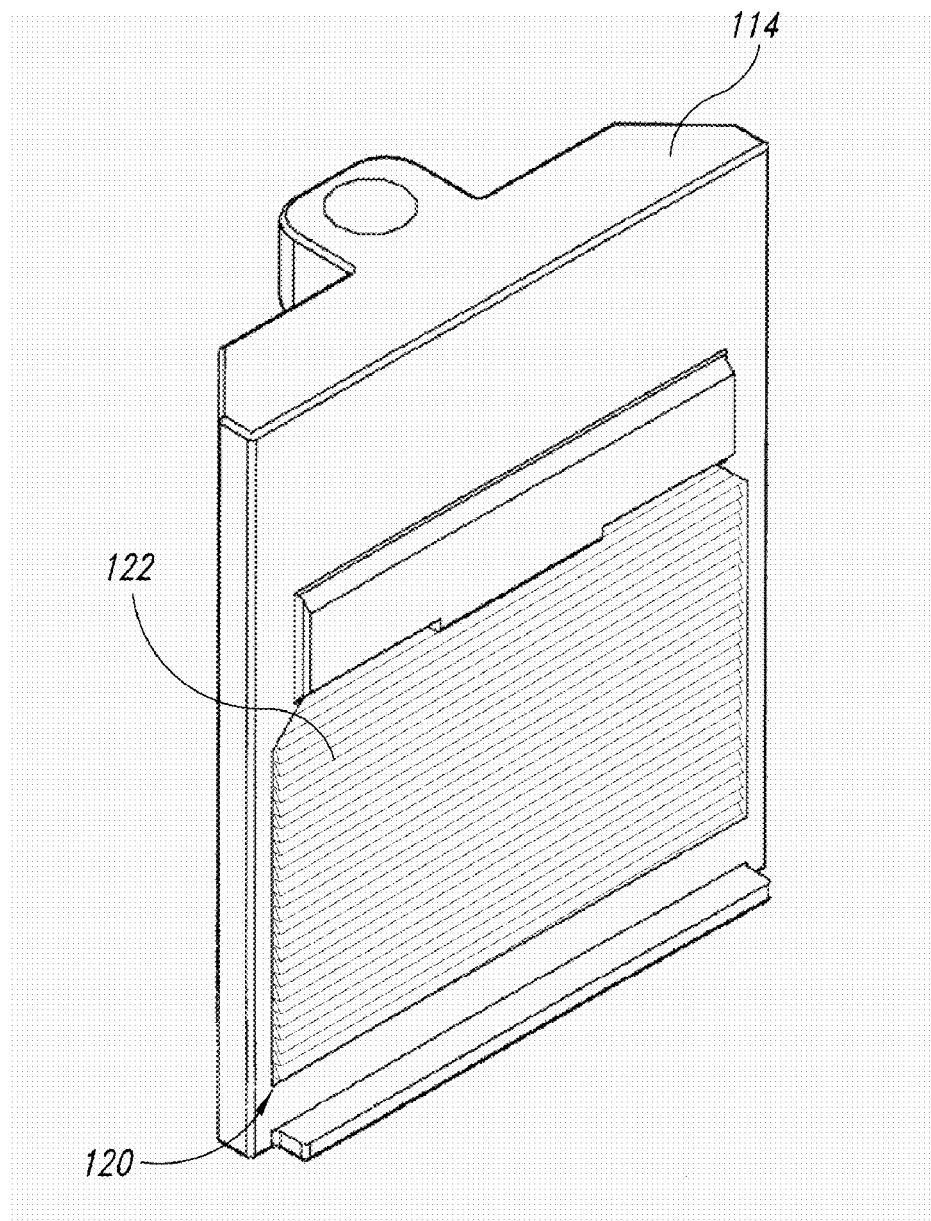
FIG. 3 is an isometric view of a rasp support member of the modular grinding core of FIG. 1 coupled to a rasp according to one embodiment.

In FIG. 2, the housing 102 is removed for clarity of illustration and description. The rasp support member 114 of the working portion 104 is configured to move with respect to the grind block member 116, for example translate along a first axis substantially parallel to a longitudinal axis 118 of the modular core 100, when actuated. The rasp support member 114 includes at least a first structural feature 120 for securing a variety of rasps, which may include a plurality of distinct grinding protuberances for different applications, respectively. In the illustrated embodiment, the first structural feature 120 includes at least one receptacle configured to securely and removably receive and engage a rasp member 122 (FIG. 3) or different rasp members 122 having different configurations of grinding protuberances, depending on the desired application. For example the rasp members 122 can snap into place by engaging a retaining structure in the periphery of the receptacle 120.

The rasp support member 114 is moveably coupled to the housing 102. For example, the rasp support member 114 can be slidably coupled to the housing 102 such that the working portion 104, and in particular, the rasp support member 114 is actuated or set in motion by an actuator or mechanism of the external grinding device to which the modular core 100 is coupled when in use.

In one embodiment, the modular core 100 includes a coupling adapter 110 that is coupled to the rasp support member 114 to move therewith. In one embodiment, the coupling adapter 110 is fixedly coupled or attached to the rasp support member 114. The coupling adapter 110 can be formed from a unitary body of material with the rasp support member 114. Alternatively, the coupling adapter 110 can be a distinct component that is configured to be fixedly coupled to the rasp support member 114.

Figure 4:
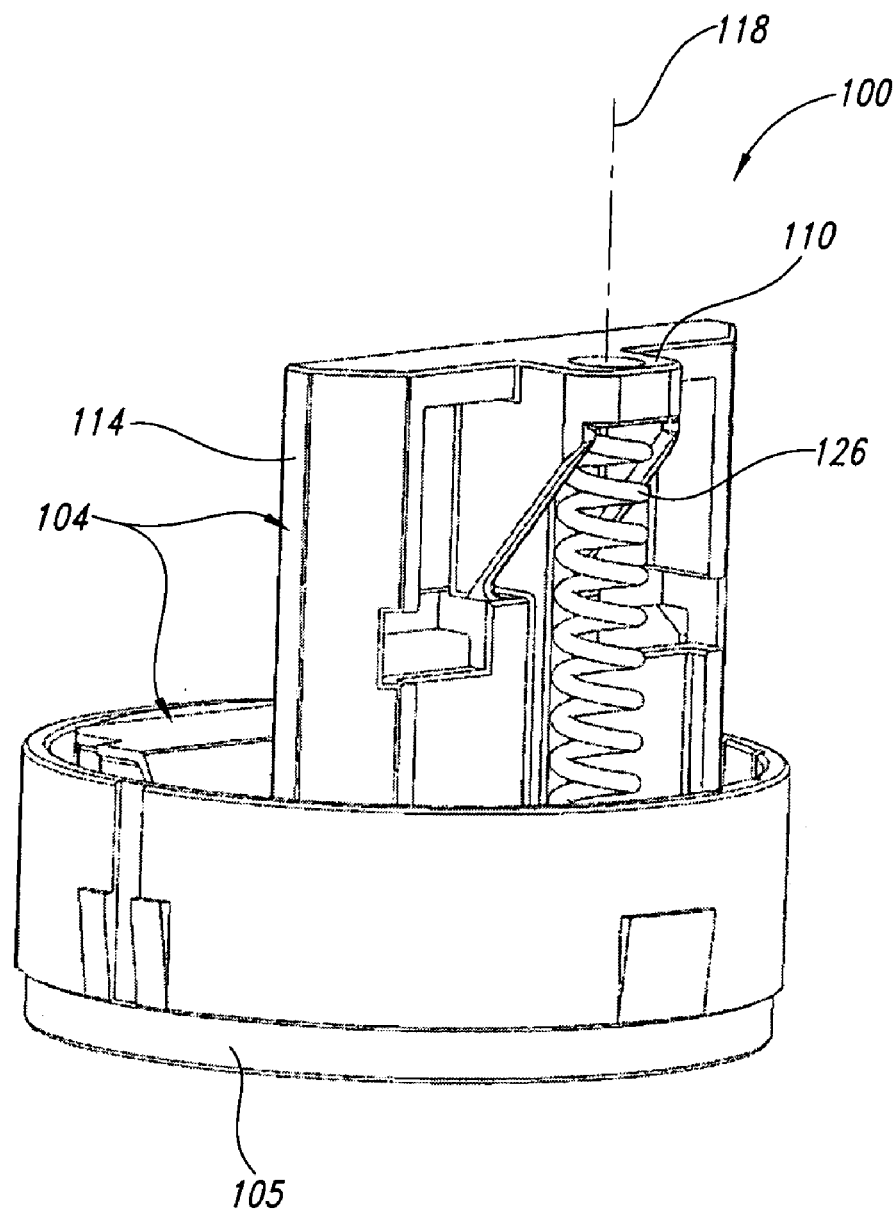
FIG. 4 is an isometric view of the working portion and an adjusting mechanism of the modular grinding core of FIG. 1 according to one embodiment.

In FIG. 4, a portion of the housing is removed for clarity of description and illustration. The working portion 104 includes a biasing member 126, at least a portion of which can be fixedly coupled to the coupling adapter 110. When the grinding core 100 is installed in the external grinding device and the actuating portion of the external grinding device facilitates the translation of the rasp support member 114, for example by exerting a force on the coupling adapter 110, the biasing member 126 is compressed. In one embodiment, the biasing member 126 includes a coil spring that is elongated in a direction substantially parallel to the longitudinal axis 118.

In this embodiment, when the force is exerted on the coupling adapter 110, the rasp support member 114 moves toward the base 105 and downward with respect to the grind block member 116. In response to the movement of the rasp support member 114, the coil spring is compressed and builds a biasing potential. Once the force is released, the coil spring expands, biasing and returning the coupling adapter 110, the rasp support member 114, and the actuating portion of the external grinding device to their respective positions before the exertion of the force. For example, the grinding core 100 can be installed in an external grinding device that includes two levers, one of which can move toward and away from the other lever to displace an actuating portion thereof. When a user presses the levers, the moveable lever moves toward the other lever, and the actuating portion which is in engagement with the coupling adapter 110, exerts the force onto the coupling adapter 110. Since the spring is fixedly attached to the coupling adapter, it compresses. When the lever is released, the compressed spring 126 expands and biases the coupling adapter 110 and the actuating portion to their respective positions before manipulation of the lever.

In a simpler embodiment, the actuating portion of the external grinding device in which the grinding core 100 is installed may include an elongated member such as a pin, which can engage the coupling adapter 110 and translate therewith to move the rasp support member 114. One of ordinary skill in the art will appreciate other configurations that in cooperation with the biasing member 126 can facilitate the reciprocation of the rasp support member 114, which fall with the scope of this disclosure. Two such examples are provided further below in conjunction with FIGS. 11A-12B.

The biasing member 126 can be positioned in any relation to the housing 102 (FIG. 1) or working portion 104 such that it is directly or indirectly fixedly coupled to the rasp support member 114 and configured to be compressed in response to the user actuating the external grinding device to which the modular core 100 is coupled. After the actuating portion returns to its original state or position before it was actuated by the user as discussed above, the user may reactuate the actuating portion to continue reciprocation of the rasp support member 114 until a desired amount of grindings are dispensed. The user may cease actuation of the actuating portion so that food item grounds, such as pepper grounds, stop dispensing from the external grinding device.

As illustrated in FIG. 2, the coupling adapter 110 may include a second structural feature 124 configured to be coupled or engaged to the actuating portion of the external grinding device. For example, the second structural feature 124 may include a cavity, a recess, a cup, an opening, or the like, which can receive a protrusion extending from the actuating portion of the external grinding device.

Figure 5:
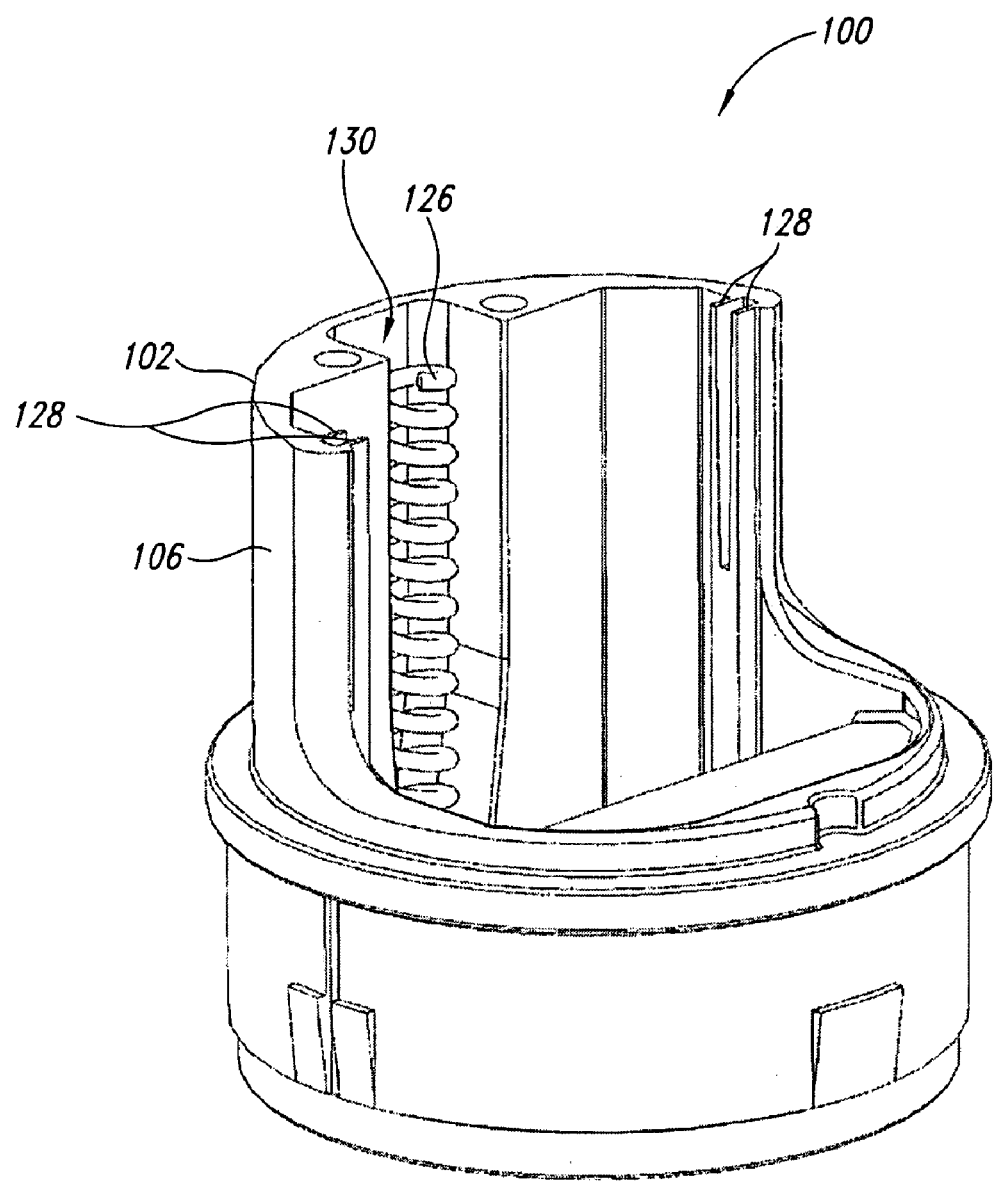
FIG. 5 is an isometric view of a portion of the working portion and adjusting mechanism of the modular grinding core of FIG. 1 according to one embodiment.

In FIG. 5, portions of the housing 102 are removed clarity of illustration and description. As illustrated in FIG. 5, the body 106 of the housing 102 can include a third structural feature 130 for housing the biasing member 126. For example, the third structural feature 130 can include an at least partially cylindrical cavity or recess, circumscribing at least a portion of the biasing member 126.

The body 106 may include coupling members 128, such as flanges forming a channel, a recess, or the like, that is configured to couple to a complementary coupling member, such as a protrusion, a rolling member, or the like that is formed on or forms a portion of the cap portion 108 (FIG. 1). For example, the cap portion 108 may comprise an extension or guard 109 (FIG. 1) that couples to the housing 102 via the coupling members 128, further securing the cap portion 108 and concealing at least a section of the working portion 104 for aesthetic purposes and for preventing debris from reaching at least some portions of the housing 102, such as regions proximate the biasing member 126. For example a channel formed by the coupling members 128 can slidably receive the extension or guard 109 of the cap portion 108. One of skill in the art will appreciate that the guard 109 can be a portion of any other suitable component instead of the cap 108, or it can be a separate part.

As illustrated in FIG. 1, the cap portion 108 can include a fourth structural feature 131, which is configured to receive at least a portion of the actuating portion of the external grinding device and guide it toward the coupling adapter 110. The fourth structural feature 131 may include an opening or channel that is aligned with the coupling adapter 110 or leads the actuating portion of the external grinding device toward the coupling adapter 110 for engagement therewith. Accordingly, the fourth structural feature 131 may facilitate installing or replacing the modular core 100 in the external grinding device.

As demonstrated above, in contrast to the conventional practice of designing distinct grinding device elements having varying structures and functionalities, the modular core 100 of the present disclosure serves as a universal core around which the remainder of the grinding device can be designed, therefore, reducing the cost of manufacturing and assembly, and also improving user adaptability.

Since the biasing device 126 is coupled to the rasp support member 114, when the working portion 104 is actuated, the coupling adapter 110 is shifted, compressing the biasing member 126 and carrying therewith the rasp support member 114. Accordingly, upon actuation of the working portion 104, the rasp member 122 (FIG. 3) is set in motion, for example, translated or reciprocated proximate the grind block member 116. When the modular core 100 is coupled to or at least partially positioned within the external grinding device, a space adjacent the working portion 104 and at least partially bounded by a surface or wall of the external grinding device, can serve as a food item storage space. The food items or spices placed in the food item storage space, for example, pepper or salt, tend to gather toward a dispensing portion 132 (FIG. 6) of the modular core 100 without dispensing from the modular core 100, as further discussed below. The dispensing portion 132 can also serve as the dispensing portion for the external grinding device when the modular core 100 is coupled to the external grinding device.

Figure 6:
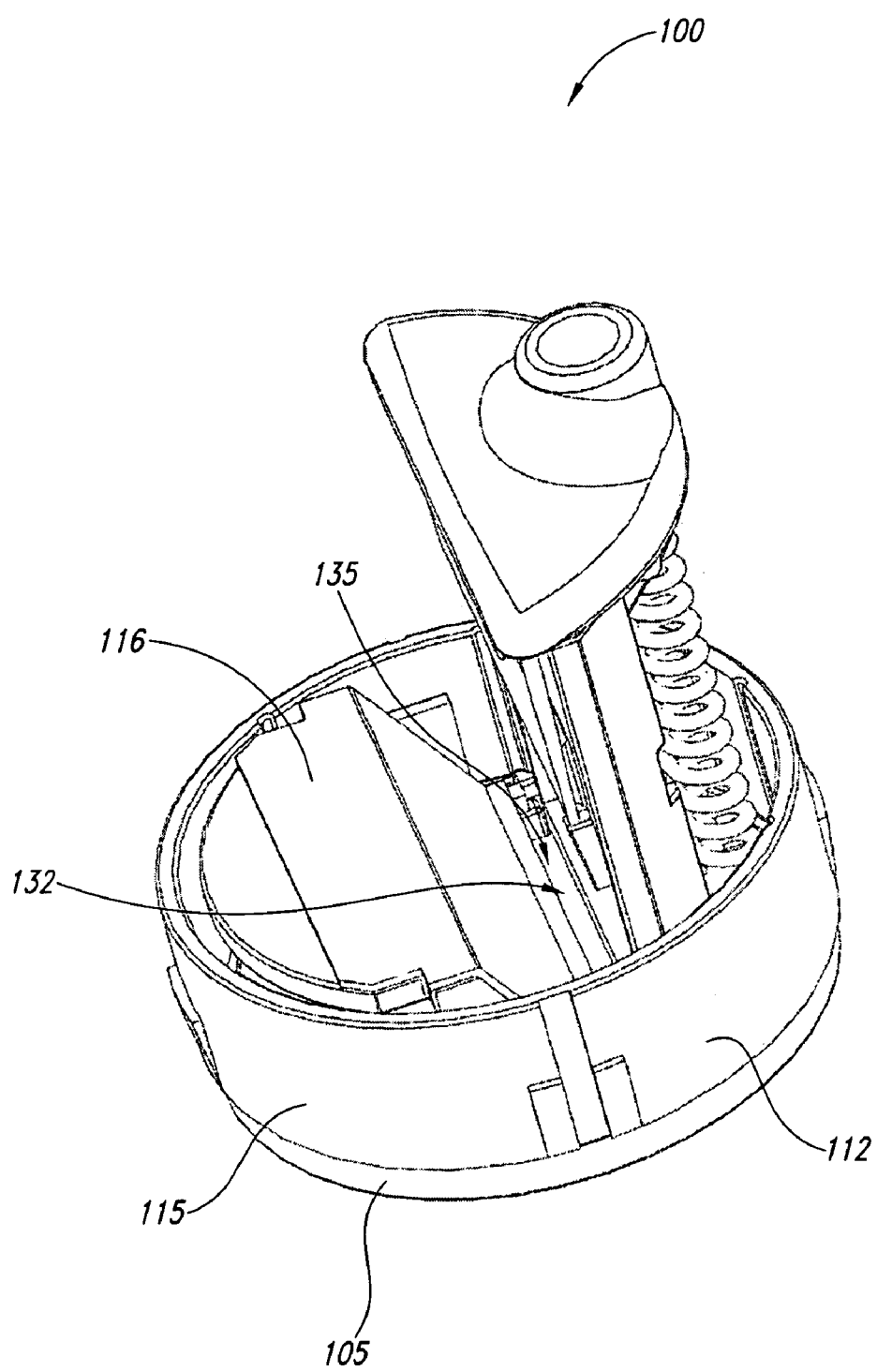
FIG. 6 is an isometric view of the working portion, adjusting mechanism and cap portion of the modular grinding core of FIG. 1 according to one embodiment.

In FIG. 6, a portion of the housing 102 is removed for clarity of illustration and description. As illustrated in FIG. 6, the dispensing portion 132 can be positioned proximate or is formed at least in part by a space or gap 135 between the grind block member 116 and the rasp member 122 when the rasp member 122 is installed in the rasp support member 114. The gap 135 can be adjustable in size by manipulation of the adjusting mechanism 112. For example, the adjusting mechanism 112 can include an adjuster ring 115 rotatably coupled to at least a portion of the housing 102, for example, the base 105. When the adjuster ring 115 is rotated with respect to the base 105, the grind block member 116 shifts toward or away from the rasp member 122 or the rasp support member 114.

The following discussion is directed to an operation for adjusting the gap 135 according to one embodiment. One of ordinary skill in the art will appreciate that in other embodiments, the specific structure or structures employed to vary the size of the gap 135 can vary.

Figure 7:
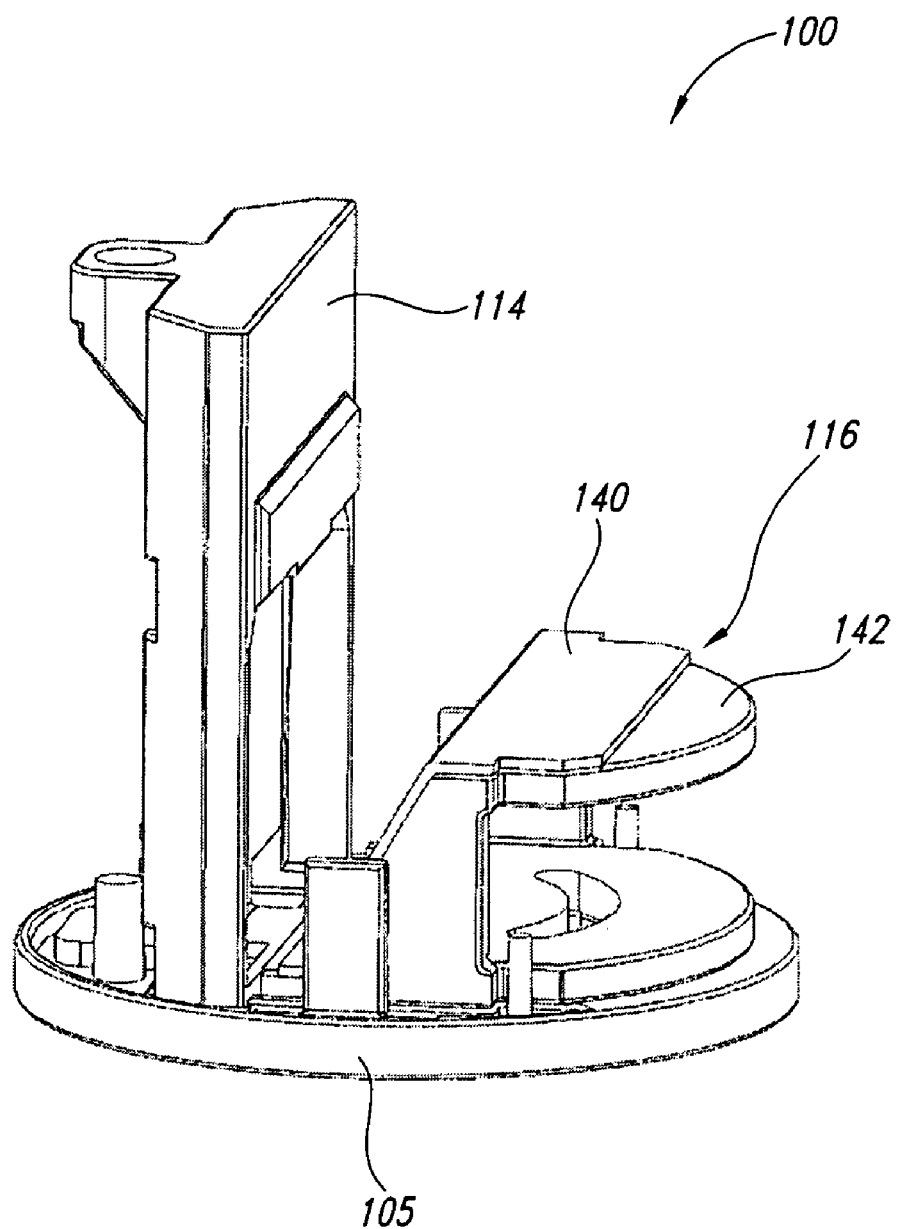
FIG. 7 is an isometric view of the working portion of the modular grinding core of FIG. 1 according to one embodiment.

In FIG. 7, portions of the housing 102, the working portion 104, and the adjuster ring 115 have been removed for clarity of illustration and description. The grind block member 116 may include a resisting portion 140 and a seat portion 142 fixedly or rigidly coupled to the resisting portion 140. The grind block member 116 is movable toward and away from the rasp support member 114. The grind block member 116 or a portion thereof can slidably rest upon or be slidably coupled to a portion of the modular core 100 such as the base 105. The adjusting mechanism 112 (FIG. 6) can be coupled to the grind block member 116 such that manipulation or rotation of the adjusting mechanism 112, sets the grind block member 116 in motion toward or away from the rasp support member 114. For example, the adjusting mechanism 112 can be biasably coupled to the grind block member 116 via a coupling member 146 (FIG. 8).

In one embodiment, the grind block member 116 can be fabricated from a unitary body of material. Alternatively, in another embodiment, the resisting and seat portions 140, 142 can be distinct components fixedly attached to each other. The resisting and seat portions 140, 142 can be fabricated from different materials that best suits their function. For example, the seat member can be fabricated from a lighter material such as plastics or composites, and the resisting portion 140 can be fabricated from a metal, such as steel, to better resists displacement of the food item or spice away from the rasp member and obtain improved grinding of the spice or food item.

Figure 8:
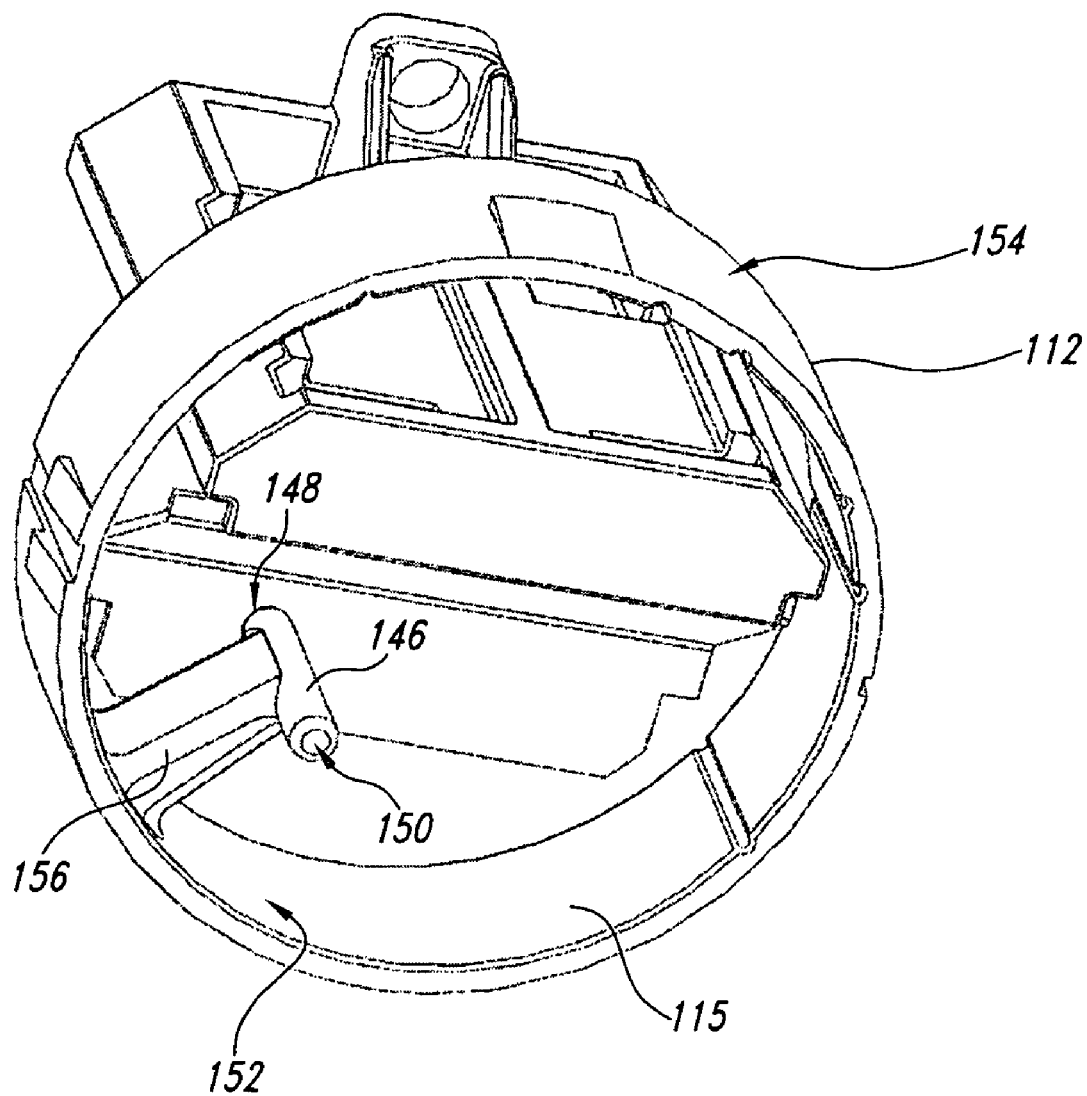
FIG. 8 is an isometric view of a portion of the working portion and adjusting mechanism of the modular grinding core of FIG. 1 according to one embodiment.

FIG. 8 is an isometric bottom view of the modular core 100 with portions of the housing 102 and the grind block member 116 removed for clarity of illustration and description. The coupling member 146 may include a first end 148 and a second end 150, opposing the first end 148.

Figure 9:
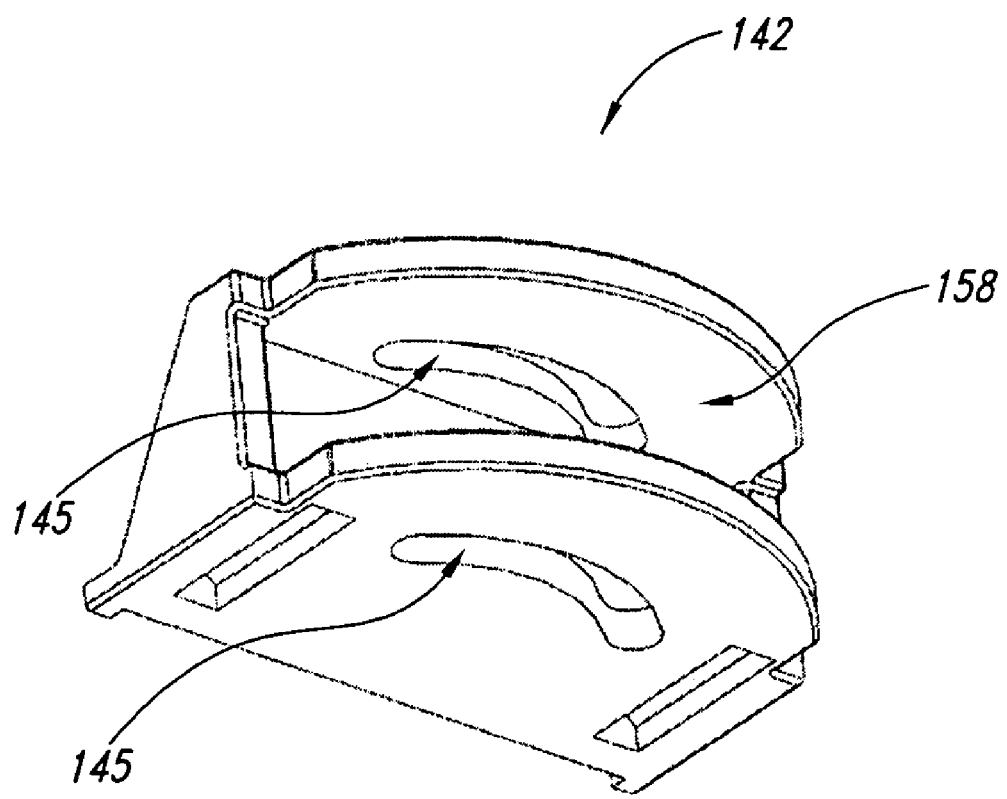
FIG. 9 is an isometric view of a portion of a grind block member of the modular grinding core of FIG. 1 according to one embodiment.

FIG. 9 illustrates the seat portion 142 of the grind block member 116. The seat portion 142 may include at least one guide feature 145 for slidably coupling to the coupling member 146 (FIG. 8) of the adjusting mechanism 112 (FIG. 8).

Figure 10:
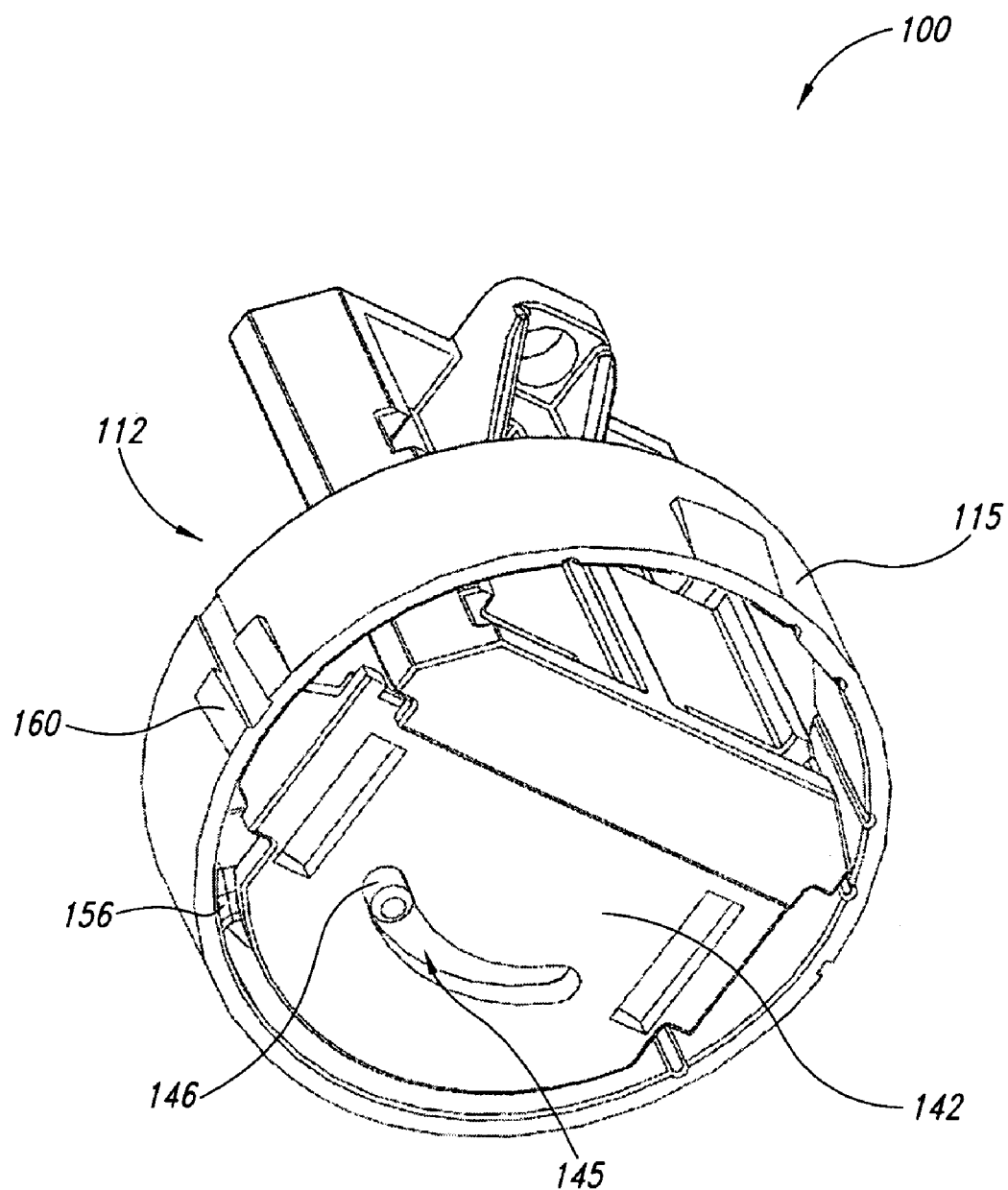
FIG. 10 is an isometric view of a portion of the working portion and adjusting mechanism of the modular grinding core of FIG. 1 according to one embodiment.

In FIG. 10, portions of the housing 102 and the working portion 104 are removed for clarity of illustration and description. As illustrated in FIG. 10, the coupling member 146 can be slidably coupled to the seat portion 142 of the grind block member 116, toward the first end 148 and/or second end 150.

The coupling member 146 can be slidably engaged with the at least one guide feature 145 (FIG. 9) formed in the resisting portion 140. In one embodiment, the coupling member 146 or a portion thereof can include a pin, a protrusion, a tab, or the like, and the guide feature 145 can include a recess, a channel, a slot, or the like, slidably receiving the coupling member 146. According to this embodiment, when the adjuster ring 115 is rotated, the coupling member 146 slides in the guide feature 145 and moves the grind block member 116 toward or away from the rasp support member 114. The guide feature 145 is configured such that when the coupling member 146 slides therein, the coupling member 146 exerts a cam-like force on a perimeter of the guide feature 145 to set the grind block member 116 in motion.

For example, the guide feature 145 may include an arcuate or curved slot with a radius different from a radius of rotation of the coupling member 146, causing the coupling member 146 to exert the force when the adjusting mechanism 112 is rotated. For example, the radius of the slot can be larger or smaller than the radius of rotation of the coupling member 146. Thus, when the coupling member 146 is positioned toward one end of the guide feature 145, the size of the gap 135 (FIG. 6) can be configured to achieve a fine grind of the food item or spice. Alternatively, when the coupling member 146 is positioned toward an opposing end of the guide feature 145, the size of the gap 135 can be configured to achieve a course grind of the food item or spice. The user may rotate the adjusting mechanism 112 to position the coupling member 146 toward either end or in a position therebetween to achieve the desired coarseness or fineness of the food item or spice grinds during and after operation of the modular core 100.

As illustrated in FIG. 8, the adjuster ring 115 includes an inner surface 152 and an outer surface 154, opposed to the inner surface 152. In one embodiment, the inner surface 152 is rotatably coupled to the base 105 (FIG. 1) of the housing 102 (FIG. 1). The coupling member 146 can be rigidly attached to the inner surface 152 of the adjuster ring 115 via an extension arm 156. Referring to FIGS. 8, 9, and 10, the seat portion 142 of the grind block member 116 includes a space 158 in which the extension arm 156 can extend to support and rotate the coupling member 146 in the guide feature 145 formed in the seat portion 142. As the adjuster ring 115 is rotated, the extension arm 156 rotates in the space 158 and the coupling member 146 rotates in the guide feature 145.

One of ordinary skill in the art will appreciate that other suitable structures or mechanisms that move at least a portion of the grind block member 116 toward or away from the rasp support member 114 for reducing or enlarging the gap 135 and achieving a finer or courser grind of the food items and spices are possible and are contemplated to be within the scope of this disclosure.

The adjusting mechanism 112 can also be used to facilitate grinding of food items or spices of a variety of types and sizes. For larger spices, the adjusting mechanism 112 can be rotated to enlarge the size of the gap 135, while for smaller spices, the adjusting mechanism 112 can be rotated to reduce the size of the gap 135.

One of ordinary skill in the art will appreciate that the modular core 100 disclosed herein can be scaled to suit larger or smaller external grinding devices. Furthermore, the adjusting mechanism 112 can be configured to be coupled to a movable structure of the external grinding device, which is rotatable with respect to the external grinding device. In this manner, rotating the movable structure of the external grinding device rotates the adjusting mechanism 112 to adjust the gap 135. For example, as shown in FIG. 10, the adjusting mechanism 112 may include at least one structural feature 160, which can be used to couple the adjuster ring 115 to a moving or rotating portion of the external grinding device. The structural feature 160 can be a wedge, protrusion, hook, detent mechanism, or any other suitable structure that is fixedly formed or attached to the adjuster ring 115 and configured to be fixedly engaged to the moving portion of the external grinding device. An example of such an embodiment is described further below in conjunction with FIG. 12A.

This may be desired where the industrial design of the external grinding device or a shell or body thereof includes an ergonomic or aesthetic design for the rotating structure that couples to the adjusting mechanism 112 of the modular core 100. In other embodiments, the adjusting mechanism 112 can be a dial, switch, knob, or any other user interface configured to adjust the gap 135, which can be positioned at any suitable location on the modular core 100, such as the base 105, the body 106, or the grind block member 116.

To illustrate the convenience and efficiency achieved through use of a modular core according to an embodiment of the present disclosure, the description that follows provides examples of grinding devices incorporating a modular core.

Figure 11A:
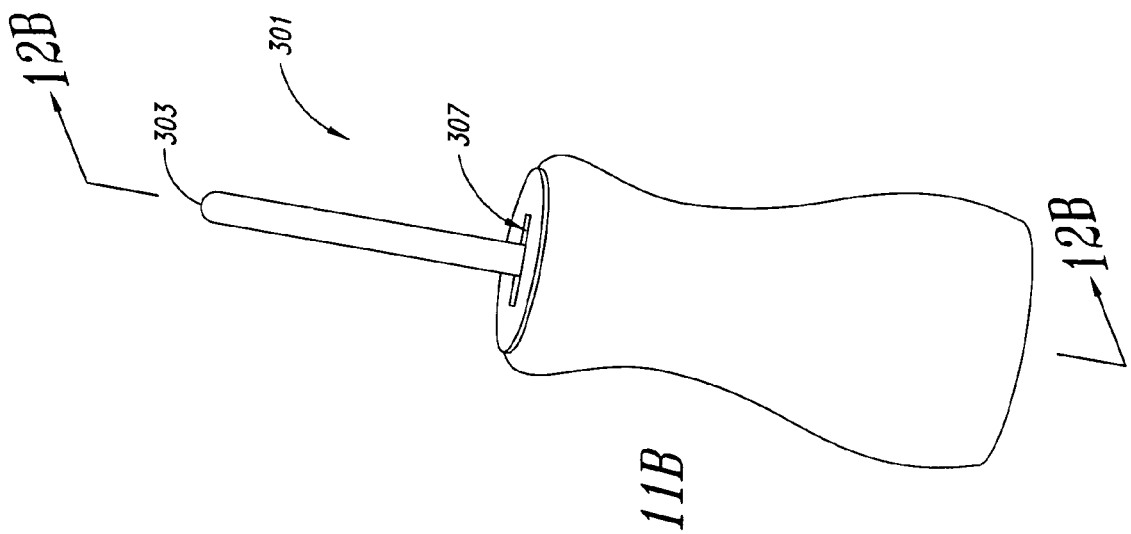
FIG. 11A is an isometric view of a grinding device according to one embodiment.
Figure 12B:
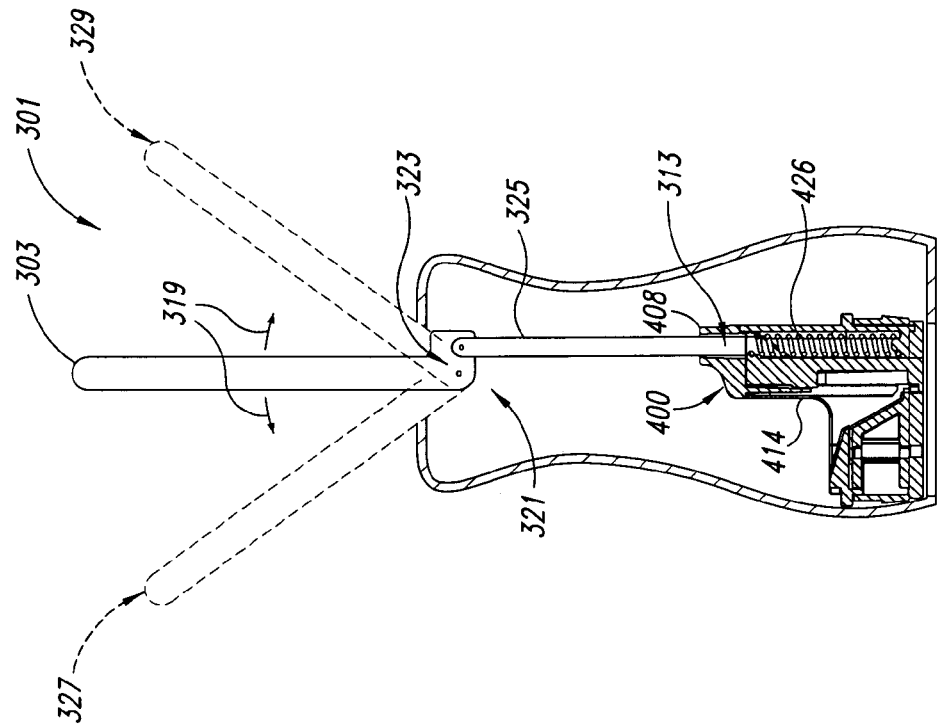
FIG. 12B is a cross-sectional view of the grinding device of FIG. 11B, viewed across section 12B-12B.
Figure 12A:
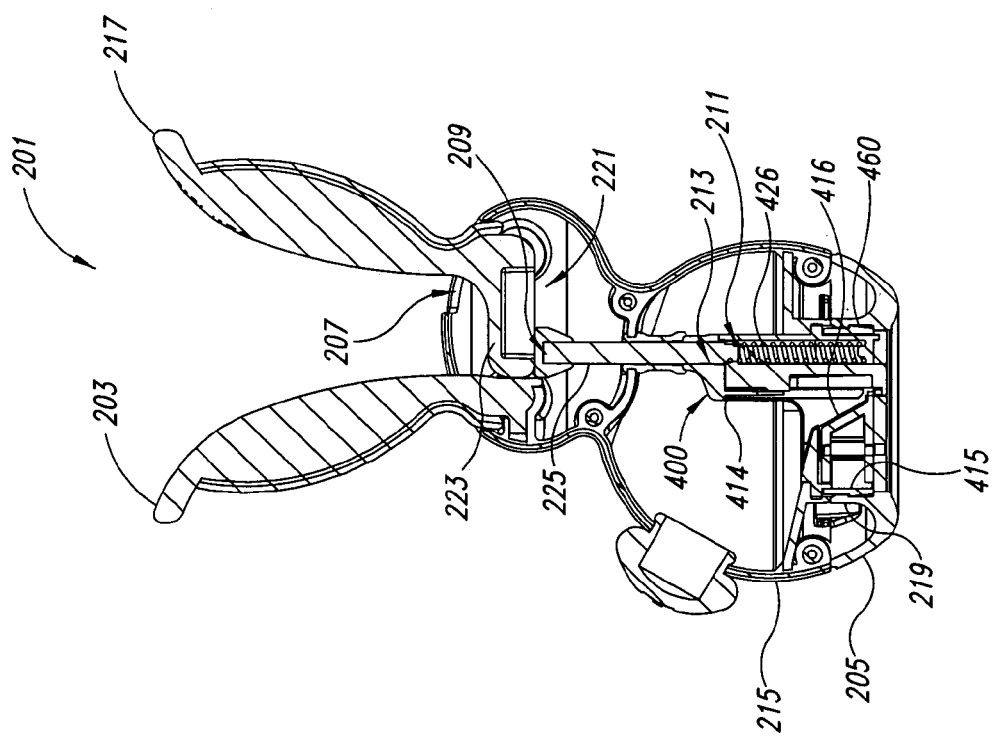
FIG. 12A is a cross-sectional view of the grinding device of FIG. 11A, viewed across section 12A-12A.

FIGS. 11A and 12A illustrate a first grinding device 201 operatively coupled to a modular core 400. The first grinding device 201 includes a non-symmetric design and first and second levers 203, 217, at least one of which can reciprocate in a corresponding slot 207 toward and away from the other of the levers 217, 203, to actuate its actuating portion 213.

Levers 203, 217 allow a user to conveniently grip one of the levers 203, 217 and move it toward the other of the first and second levers 203, 217. For example, in the illustrated embodiment of FIGS. 11A and 12A, the second lever 217 can move in the slot 207 toward the first lever 203. Toward its first end 221, the second lever 217 includes at least one flange 223 fixedly coupled to a first end 209 of a shaft member 225 toward a free distal end with respect to the second lever 217. The actuating portion 213 discussed above is positioned toward or forms a second end 211 of the shaft member 225, opposed to the first end 209. The at least one flange 223 extends in a direction toward the first lever 203. As the user forces the second lever 217 toward the first lever 203, the flange 223 rotates and exerts a force on the first end 209 of the shaft member 225, which in turn causes the actuating portion 213 to move the rasp support member 414.

As illustrated in FIG. 12A, in one embodiment, a housing of the first grinding device 201 includes a first portion 205 that is movable with respect to a second portion 215 thereof. Furthermore, the modular core 400 can include an adjuster ring 415 similar to that discussed above. The adjuster ring 415 includes at least one structural feature 460 that is configured to be removably engaged with or coupled to at least one complementary structural feature 219 formed on the movable portion 205 of the grinding device 200. Therefore, the user can adjust the gap between the rasp support member 414 and grind block member 416 externally with respect to the modular core 400. As discussed above, in such an embodiment, the modular grinding core 400 can incorporate a desired external device design that is ergonomic while allowing full operation of the modular core 400 by manipulation of components of the external grinding device 201.

Figure 11B:
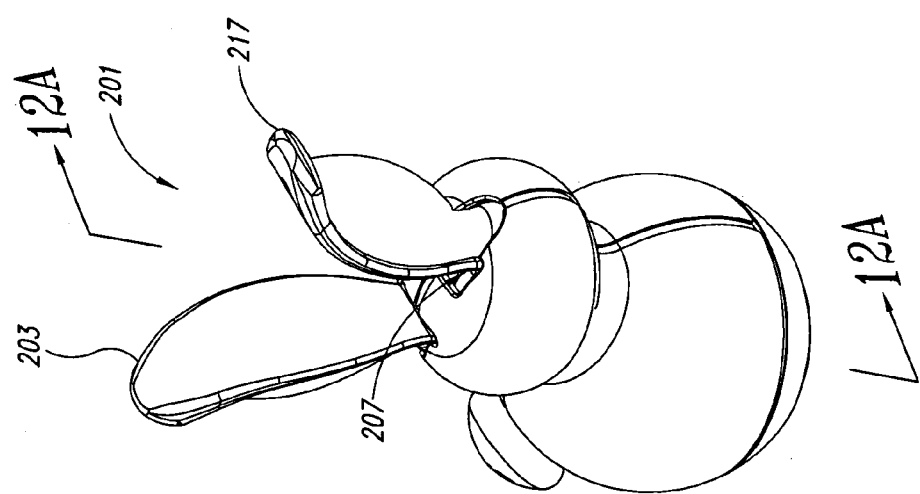
FIG. 11B is an isometric view of a grinding device according to another embodiment.

FIG. 11B is a schematic illustration of a second grinding device 301 coupled to the same modular core 400 (FIG. 12B) as the modular grinding core 400 discussed in conjunction with FIGS. 11A and 12A. In contrast, to the first grinding device 201, the second grinding device 301 includes a symmetrical design and one lever 303 that can reciprocate in a slot 307 to actuate its actuating portion 313 (FIG. 12B).

Referring to FIGS. 11B and 12B, the lever 303 can reciprocate in a substantially lateral or radial direction 319. Toward its first end 321, the lever 303 includes a cam portion 323 that is pivotably coupled to a shaft member 325. As the lever 303 is moved from a first position 327 to a second position 329, the cam portion 323 rotates and exerts a force on the shaft member 325 in a direction toward the biasing member 426 and/or the rasp support member 414 in a manner as discussed above. The actuating portion 313 of the shaft member 325 can extend through an opening in the cap portion 408 to engage at least a portion of the biasing member 426, the rasp support member 414, and/or the cap portion 408.

As the first and the second grinding devices 201, 301 demonstrate, grinding devices that are distinct in their design and functionality can use a single modular core according to an embodiment of the present disclosure, obviating the need to design distinct grinding cores when the shell or external body of the grinding device is redesigned. As discussed in length above, the modular core greatly reduces manufacturing costs and improves consumer adaptability. Furthermore, a manufacturer can provide a grinding device design in which the modular core can be removed. In such an embodiment, a kit can be provided for consumers, which includes different types of rasp members for different applications, allowing the consumer to remove and replace the rasp member in the rasp support member of the modular core. In addition, since a modular core according to an embodiment of this disclosure is universal, chances of defects during manufacturing are minimized. Even if problems arise during use, the user can simply replace only defective portions of the modular core or the entire core without having to replace the entire grinding device.

One of ordinary skill in art can appreciate these and other modifications that can be made to a modular core or a grinding device according to an embodiment of the present disclosure, that are within the scope of the present disclosure and the claims that follow.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A modular grinding core, for use with a variety of external grinding devices each having an actuation mechanism, and for use with a variety of rasps each having a distinct plurality of grinding protuberances, to grind a spice or other food item, the modular grinding core comprising:
    a housing having a base, a cap portion, and a body at least partially extending between the base and the cap portion;
    a rasp support member having a coupling adapter configured to be operatively coupled to the actuation mechanism of a first external grinding device at a first time and to the actuation mechanism of a second external grinding device at a second time after being removed from the first external grinding device, the rasp support member being moveably coupled to the housing and configured to reciprocate along a first axis in response to a force exerted by the actuation mechanism; and
    a grind block member moveably coupled to the housing and positioned adjacent the rasp support member forming an adjustable gap between the grind block member and the rasp support member, the grind block member being configured to resist displacement of the spice or food item away from the rasp support member.

2. The modular grinding core of claim 1 wherein the cap portion includes an opening configured to slidably receive a portion of the actuation mechanism of any one of the variety of the external grinding devices and guide the portion toward the coupling adaptor.

3. The modular grinding core of claim 2 wherein the coupling adaptor includes an opening being coaxial with the opening in the cap portion and positioned on a side of the rasp support member opposing a side thereof facing the grind block member.

4. The modular grinding core of claim 1 wherein the rasp support member includes a receptacle configured to removably receive and secure any one of the variety of rasps.

5. The modular grinding core of claim 1, further comprising:
    a biasing member coupled to the rasp support member and configured to contract in response to the force exerted by the actuation mechanism of the external grinding device on the coupling adapter and to expand when the force is reduced, to facilitate a return of the actuation mechanism to a rest position it was in before being actuated and also to facilitate the reciprocation of the rasp support member.

6. The modular grinding core of claim 1, further comprising:
    an adjusting mechanism moveably mounted to the housing wherein moving the adjusting mechanism with respect to the housing moves the grind block member toward and away from the rasp support member to adjust the gap between the grind block member and the rasp support member.

7. The modular grinding core of claim 6 wherein the adjusting mechanism includes a coupling member slidably coupled with respect to the grind block member, rotation of the adjusting mechanism causing the coupling member to bear against a portion of the grind block member as it slides with respect thereto, thereby moving the grind block member toward and away from the rasp support member to adjust the gap between the grind block member and the rasp support member.

8. The modular grinding core of claim 6 wherein the adjusting mechanism includes an adjusting ring rotatably coupled to the base and a coupling member having first and second portions, the coupling member being fixedly coupled to the adjusting ring toward the first portion and slidably received in a curved slot formed in the grind block member toward the second portion, the coupling member having a radius of rotation as the adjusting ring rotates, the radius of rotation being different than a radius of the curved slot, rotation of the adjusting ring causing the coupling member to bear against a periphery of the slot to move the grind block member toward and away from the rasp support member to adjust the gap between the grind block member and the rasp support member.

9. The modular grinding core of claim 8 wherein the grind block member includes a resisting portion fixedly coupled to a seat portion, the curved slot being formed in the seat portion, the resisting portion facing the rasp support member to resist displacement of the spice or food item away from the rasp support member, the resisting portion being positioned at an angle with respect the rasp support member.

10. The modular grinding core of claim 8 wherein the adjusting mechanism further includes an arm and the adjusting ring includes an inner surface and an outer surface, a first portion of the inner surface being rotatably mounted about the base to allow rotation of the adjusting ring about the base, the arm having first and second ends, the first end being fixedly attached to a second portion of the inner surface, the second end being fixedly attached to the coupling member.

11. The modular grinding core of claim 6 wherein the adjusting mechanism includes at least one structural feature configured to removably couple the adjusting mechanism to an external adjusting mechanism of any one of the variety of external grinding devices for moving therewith and allowing adjustment of the gap between the grind block member and the rasp support member externally with respect to the modular grinding core.

12. The modular grinding core of claim 1 wherein the housing includes a guard adjacent at least a portion of the rasp support member, the guard extending from the cap portion toward the base, substantially preventing debris from reaching at least some portions in the housing.

13. The modular grinding core of claim 1 wherein the grind block member includes a resisting portion facing the rasp support member to resist displacement of the spice or food item away from the rasp support member, the resisting portion being made from a material different than a material from which a remainder of the grind block is made.

14. A modular grinding kit comprising:
    at least a first external grinding device having a housing and an actuation mechanism;
    at least a first rasp member having a first plurality of grinding protuberances, to grind a spice or food item;
    a modular core at least partially positionable within the housing of the first external grinding device including:
        a housing having a base, a cap portion, and a body at least partially extending between the base and the cap portion;
        a rasp support member having a coupling adapter configured to be operatively coupled to the actuation mechanism of the first external grinding device and removably coupled to the first rasp member, the rasp support member being moveably coupled to the housing and configured to reciprocate along a first axis in response to a force exerted by the actuation mechanism; and a grind block member moveably coupled to the housing and positioned adjacent the rasp support member forming an adjustable gap between the grind block member and the rasp support member, the grind block member being configured to resist displacement of the spice or food item away from the rasp support member.

15. The modular grinding kit of claim 14, further comprising:

at least a second external grinding device having a housing and an actuation mechanism different from the housing and actuation mechanism of the first external grinding device, the modular core being at least partially positionable within the housing of the second external grinding device, the coupling adaptor being configured to be operatively coupled to the actuation mechanism of the first grinding device at a first time and to the actuation mechanism of the second external grinding device at a second time after being removed from the first external grinding device.

16. The modular grinding kit of claim 14 wherein the housing of the first external grinding device includes first and second portions, the first portion being movably coupled with respect to the second portion and configured to be operatively coupled to the grind block member to move the grind block member, allowing a user to adjust the gap between the grind block member and the rasp support member externally with respect to the modular core.

17. The modular grinding kit of claim 14 wherein the cap portion includes an opening slidably receiving the actuation mechanism of the first external grinding device and sized to guide a portion of the actuation mechanism toward the coupling adaptor.

18. The modular grinding kit of claim 14, further comprising:

at least a second rasp member having a second plurality of grinding protuberances, distinct from the first plurality of grinding protuberances, wherein the rasp support member includes at least one structural feature configured to receive and removably secure any one of the first and at least second rasp members to the rasp support member when the other is removed therefrom.

19. The modular grinding kit of claim 14, further comprising:

a biasing member coupled to the rasp support member and configured to contract in response to the force exerted by the actuation mechanism of the first external grinding device on the coupling adapter and expand when the force is reduced to facilitate a return of the actuation mechanism to a rest position it was in before being actuated and also to facilitate the reciprocation of the rasp support member.

20. The modular grinding kit of claim 14, further comprising:

an adjusting mechanism having an adjusting ring rotatably coupled to the housing of the modular core and operatively coupled to the grind block member such that rotation of the adjusting ring moves the grind block member toward and away from the rasp support member to adjust the gap between the grind block member and the rasp support member wherein the first external grinding device includes first and second portions, the first portion being rotatably coupled with respect to the second portion and configured to be coupled to the adjusting ring to move therewith, allowing a user to adjust the gap between the grind block member and the rasp support member externally with respect to the modular grinding core.

21. The modular grinding kit of claim 14 wherein the housing of the modular core includes a guard adjacent at least a portion of the rasp support member, the guard extending from the cap portion toward the base, substantially preventing debris from reaching at least some portions in the housing.

22. The modular grinding kit of claim 14 wherein the actuation mechanism includes at least one lever and a shaft member having first and second ends, the shaft member operatively coupled to the lever toward the first end, movement of the lever moving the shaft member substantially parallel to the first axis, the shaft member configured to be removably coupled to the coupling adaptor toward the second end to move therewith.

* * * * *